United States Patent [19]

Pflüger

[11] Patent Number: 4,517,482
[45] Date of Patent: May 14, 1985

[54] VEHICULAR-TYPE ALTERNATOR WITH SPEED-RESPONSIVE FAN COUPLING

[75] Inventor: Gerhard Pflüger, Markgröningen, Fed. Rep. of Germany

[73] Assignee: Robert Bosch GmbH, Stuttgart, Fed. Rep. of Germany

[21] Appl. No.: 564,734

[22] Filed: Dec. 23, 1983

[30] Foreign Application Priority Data

Feb. 14, 1983 [DE] Fed. Rep. of Germany ....... 3305006

[51] Int. Cl.³ .................. F16C 19/12; H02K 7/08
[52] U.S. Cl. .................... 310/78; 310/60 R; 310/68 D; 384/506; 464/36
[58] Field of Search ............ 308/184 A, 189 A, 197, 308/207 A, 216, 196, 189; 310/90, 78, 52, 53, 62, 60 R, 68 D; 464/10, 30, 36; 384/506

[56] References Cited

U.S. PATENT DOCUMENTS

| | | | |
|---|---|---|---|
| 1,446,633 | 2/1923 | Baker | 308/189.1 |
| 3,555,317 | 1/1971 | Allen | 310/62 |
| 3,940,192 | 2/1976 | Hägele | 308/189 A |
| 4,059,317 | 11/1977 | McCloskey | 308/196 |
| 4,329,000 | 5/1982 | Keske | 308/196 |
| 4,397,380 | 8/1983 | Yew | 310/78 |
| 4,437,846 | 3/1984 | Ragaly | 464/36 |
| 4,463,275 | 7/1984 | Ragaly | 310/78 |

FOREIGN PATENT DOCUMENTS 2942737  5/1981  Fed. Rep. of Germany .

Primary Examiner—Peter S. Wong
Assistant Examiner—D. L. Rebsch
Attorney, Agent, or Firm—Frishauf, Holtz, Goodman & Woodward

[57] ABSTRACT

To limit the maximum speed of the fan blade of an automotive-type alternator, the fan blade (21) is secured to the outer race (23) of a ball bearing (22) having a two-part inner race (24, 25), one of the parts being an axially slidable sleeve (25) which is spring-pressed by a cup spring (26) in engagement with a drive pulley (18) against the first race (24). Until a certain limiting reactive pneumatic force or frictional force is reached, the cup spring (26) will clamp the balls (22) between the inner and outer races, so that the fan blade (21) will rotate with the pulley; when the reactive force and speed are exceeded, however, the fan blade can rotate about the balls (22), and hence slip with respect to the rotation of the pulley (18).

17 Claims, 1 Drawing Figure

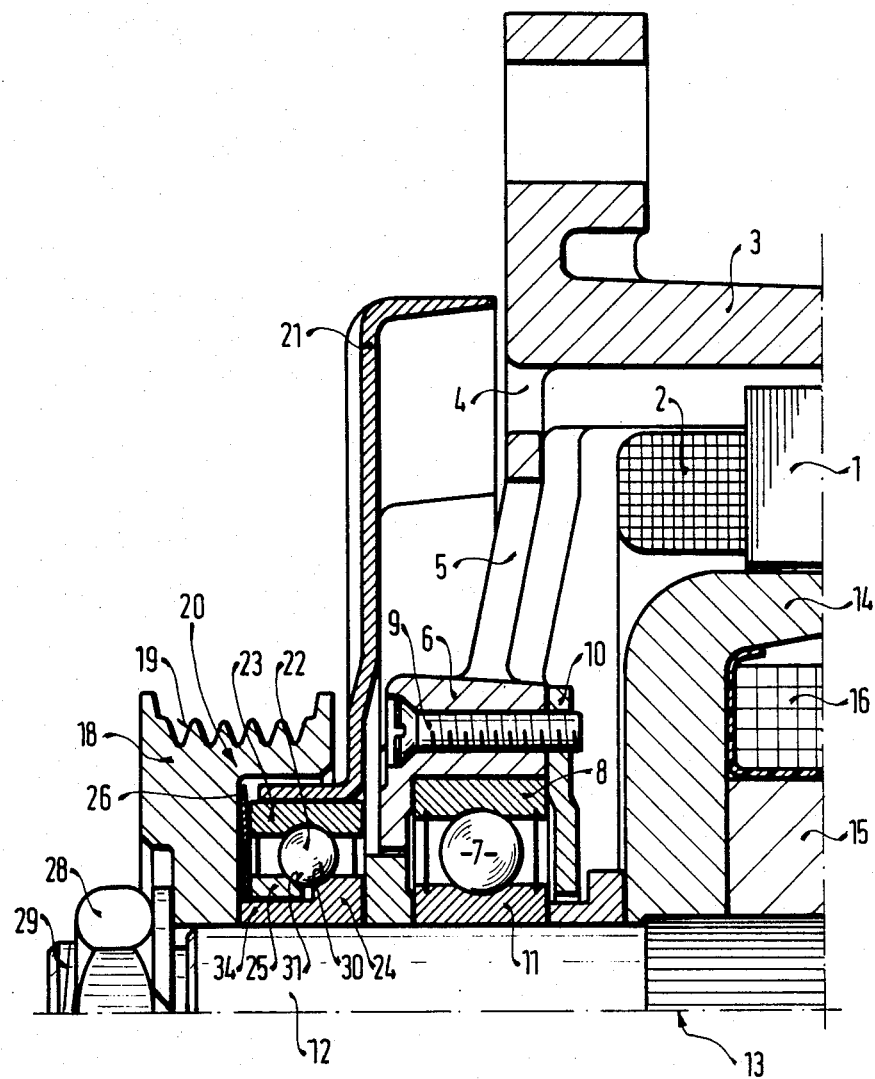

VEHICULAR-TYPE ALTERNATOR WITH SPEED-RESPONSIVE FAN COUPLING

The present invention relates to a vehicular-type alternator, and especially an alternator for use in combination with an internal combustion engine powering an automotive vehicle, and has a cooling fan located on the drive shaft of the alternator, driven by the alternator, and coupled by a variable speed coupling to prevent excessive speed of the fan blade upon high-speed rotation of the drive shaft of the alternator.

BACKGROUND

Automotive alternators are driven at widely varying speeds. Alternators of that type usually include a fan wheel to cool the alternator. It is usually seated on the alternator shaft, and may be coupled to the alternator shaft by a coupling which may include a ball bearing and a friction drive which provides for frictional engagement of the fan blade with the drive pulley of the alternator, but permits slipping of the fan blade with respect to the drive pulley of the alternator if the engine speed, and hence the speed of the alternator, rises above limits which would be detrimental to operation of the fan blade, or cause excessive noise or power consumption.

Speed-dependent or speed-limited fan blade couplings have been previously proposed; see, for example, German Patent Disclosure Document DE-OS No. 29 42 737 corresponding to U.S. Pat. No. 4,437,846, Ragaly, issued Mar. 20, 1984. In one such arrangement, two ball bearings are located on a single drive shaft for the alternator, one of the ball bearings journalling the drive shaft with respect to the alternator housing, the other ball bearing securing the fan blade on the alternator shaft. The ball bearing which is immediately adjacent the end bell or end plate of the alternator is axially irremovably secured to the generator shaft. The outer race of the ball bearing is coupled to the fan blade. The other ball bearing has its inner race axially slidably located on the shaft, and has its outer race positioned against a leaf spring which provides axial compressive force against the outer race of the first ball bearing. As the speed of the shaft increases, driven by a pulley which, for example, is coupled by a V-belt with the engine, the outer race of the ball bearing carrying the fan blade is carried along until the resistance torque of air flow which must be overcome by the fan wheel increases beyond the frictional torque set by the spring between the two ball bearings. As the speed of the shaft increases, the speed of the outer race of the ball bearing carrying the fan blade increases only slightly, or may remain constant or steady.

The foregoing construction is somewhat difficult to assemble, particularly under mass production conditions.

THE INVENTION

It is an object to improve a speed-dependent coupling between a fan blade ball bearing and a drive shaft, driven, for example, by a pulley coupled to an internal combustion engine (ICE), which is simple, reliable, and is easily assembled.

Briefly, the ball bearing supporting the fan blade or ventilator blade has an outer race to which the ventilator blade is secured. The inner race of the ball bearing is formed of two elements, each one of which has a running surface for the balls. One of the elements is subjected to an axially directed force, for example by means of a compression spring, to permit axial sliding movement and clamp the balls in the ball bearing during rotation of the shaft at a lower speed range, but permit rotation of the shaft relative to the outer race at a higher speed range and when the loading torque reflected by the fan or ventilator blade rises above the axially directed clamping force exerted by the axially slidable race element against the balls of the race.

The arrangement has the advantage that the ball bearings can be easily made and assembled, and an axially slidable, two-part inner race can be formed as a ring, slidable within a circumferential groove of a standard inner ball bearing race, and pressed axially, to clamp the balls, by a dished or cup spring.

DRAWING

The single FIGURE is a fragmentary axial cross section through the drive portion of a claw-pole alternator which can be of standard automotive-type construction.

DETAILED DESCRIPTION

The alternator is a standard automotive alternator of the claw-pole type, and has a stator lamination stack 1 on which three phase windings 2 are wound, distributed about the circumference of the stator lamination stack. An end bearing and support shield or bell 3, for example made of injection pressure-cast aluminum, has a plurality of ventilation openings 4 to form ventilation openings between radially extending support struts or plate elements 5. The drive-side hub 6 is located in the end plate or shield. A sturdy ball bearing 7, having an outer race 8, is fitted, for example, by a press or interference fit, in the hub 6 and secured by a retention washer 10, held in position by a plurality of screws 9 within the hub 6. The retention washer 10 may, additionally, form an oil shield, in the form of a labyrinth, to prevent oil from entering the interior of the alternator.

The inner race 11 of the alternator ball bearing is seated on a shaft extension 12 of the alternator shaft 13. The alternator shaft 13 retains the claw-pole armature structure 14, the exciter core 15, and the field or exciter winding 16. The structure so far described can be in accordance with any standard and well-known automotive-type alternator arrangement.

The generator shaft 13 is driven by an internal combustion engine (ICE) (not shown) to which one or more V-belts are coupled which, in turn, are looped about the running surface of a pulley 18. The running surface 19 of the pulley, preferably, is corrugated or ribbed.

A speed-dependent coupling 20 is located between the pulley 18 and the main bearing 7. The speed-dependent or torque-dependent coupling is provided to rotate a fan or ventilator wheel 21 together with rotation of the pulley 18 up to a certain predetermined limiting speed. As the speed of the ICE driving the alternator increases, the torque or speed-dependent coupling 20 carries the fan blade 21 along. When the limiting speed is reached, the fan blade 21 slips with respect to the pulley 18, so that its speed will increase only slightly or not at all. The power delivered by the fan to cool the generator, thus, is limited to an upper value; the mechanical loading at high speed likewise is limited.

In accordance with a feature of the invention, the speed or torque-limiting coupling comprises a single-row ball bearing having a plurality of balls 22 which are guided within an outer race 23. The outer race 23 is secured to the fan or ventilator blade 21. The inner race of the ball bearing which, at the same time, forms the speed or torque-dependent coupling, in accordance with a feature of the invention, is made in two parts. One of the parts is a sleeve 24 which has a hub-like extension 34 projecting axially. The other part is a longitudinally slidable ring 25 which is seated on the extension 34 and is axially pressed by a cup spring 26, for example having only shallow bowing, engaging with its outer edges a recess within the pulley 18, and with its inner edges engaging the axially slidable ring or sleeve 25.

Each one of the race parts 24, 25 has concave race or running surfaces 30, 31 for the balls 22. The shaft extension 12 is formed with a threaded end 29 on which a nut 28 is positioned which can be tightened, over a washer—as well known—against the pulley 18.

OPERATION

Radially directed forces, applied axially by the cup spring 26, cause friction between the outer race 23 and the hub 34, or the race 24 of the inner ball bearing parts, thus clamping the balls 22 between the inner and outer races. The friction can be adjusted by deformation of the cup spring 26 upon tightening of the nut 28 on the threaded end portion 29 of the shaft extension 12.

The running surfaces 30, 31 of the inner race parts 24, 25 are inclined with respect to each other. Upon tensioning the spring 26, radially outwardly directed forces will be applied to the outer race 23 and to the balls 22, and thus increase the clamping effect between the inner and outer races and, thus, increase the speed limit or torque limit up to which the fan or ventilator blade 21 is carried along by the ball bearing. Above the limit, and when the frictional force falls below the reactive force applied to the fan or ventilator blade by increased pneumatic work output, the balls 22 will act as ball bearings within the race 23 and the inclined surfaces 30, 31 and permit slippage of the fan blade 21 with respect to the rotary speed of the pulley 18. The inner race 24 may be secured to the shaft 12, or may be merely seated thereon, and held in frictional engagement against a suitable abutment, for example splined, or otherwise secured to the shaft 12, or even against the inner race 11 of the main ball bearing which can be securely seated on the shaft extension 12.

The cup spring 26 which is engaged within a recess of the pulley 18 has a further and additional function: It also functions as a sealing element for the coupling 20, formed by the ball bearing, and hence of the balls 22. The arrangement can be made small, and located within a recess of the pulley 18, so that the variable torque or variable speed coupling need not extend the axial length of the alternator structure, and permits inexpensive assembly which is particularly easy to carry out under mass production conditions.

Various changes and modifications may be made, and the relative position of the two-part races and the single race, namely whether it is the inner or outer, can be reversed; the reference herein to "inner" and "outer" race is merely for convenience of explanation.

I claim:

1. An improved, reduced-noise vehicular-type alternator and fan combination having
   a drive shaft (12, 13);
   a drive pulley (18) secured to the drive shaft for rotation of the drive shaft;
   a fan wheel (21);
   a ball bearing (22) interposed between the fan wheel and the drive shaft;
   wherein the improvement comprises:
   means (20) for reducing fan noise at high alternator shaft rotation speeds by rotating the fan wheel at the same speed as the drive shaft within a limited speed range, but uncoupling said fan (21) from the drive shaft (12,13) to permit relative rotation of the drive shaft and the fan wheel, and thus a lower rotation speed of the fan than of the shaft, when the limited speed range is exceeded,
   said means (20) comprising,
   a pair of coaxially aligned inner ball bearing race elements (24,25) for said ball bearing, located on the drive shaft, one of the race elements (24) having a hub-like axial extension (34) and the other race element being an axially slidable ring (25) located on said hub-like extension;
   an outer race (23) secured to the fan wheel;
   balls (22) interposed between said outer race and the pair of race elements,
   each race element of said pair (24,25) having a running surface (30, 31) for the balls; and
   axial friction force means (26) applying an axial force against said pair of race elements to urge said elements (24,25) toward each other and thereby frictionally clamp the balls (22) of the ball bearing, during rotation of the shaft within said limited speed range, against the races (23,24,25), but permit relative rotation of the shaft the the fan wheel when the loading reaction force exerted by the fan wheel (21), upon exceeding the speed range, on the outer race (23) rises above the axially directed friction clamping force,
   said axial friction force means comprising a ring disk (26) having a portion engaging said axially slidable race element (25), and having another portion supported against the drive pulley (18) in fixed axial position.

2. Alternator according to claim 1, wherein said ring disk comprises a shallow cup spring.

3. Alternator according to claim 1, wherein said drive pulley (18) is formed with an axially extending ring-shaped recess;
   and said ball bearing is located within said axially extending recess.

4. Alternator according to claim 2, wherein said drive pulley (18) is formed with an axially extending ring-shaped recess;
   said ball bearing is located within said axially extending recess;
   and the outer region of the shallow cup spring bears against an axially directed surface of said pulley within said recess.

5. Alternator according to claim 4, further including means (11) defining an abutment for axially positioning said one race part (24) having the axially extending hub portion (34) thereon in axially fixed location on the drive shaft of the alternator.

6. Alternator according to claim 5, further comprising
   an end shield (3) of said alternator;
   a drive-side hub (6) located in said shield; and
   a main ball bearing (7), having an outer race (8) and an inner race (11), and journalling said hub (6) on said alternator shaft (12).

7. Alternator according to claim 6, wherein said means defining an abutment comprises the inner race (11) of said main ball bearing (7).

8. Alternator according to claim 2, further comprising
means (28,29) for adjusting friction in said friction force means (20) by varying deformation of said cup spring (26).

9. Alternator according to claim 8, wherein said friction adjusting means comprises:
a threaded end portion (29) on said shaft (12) adjacent said pulley (18); and
a nut (28) adjustably mounted in axial relation to said cup spring (26) on said threaded end portion (29).

10. Vehicular-type alternator having
a drive shaft (12, 13);
a drive pulley (18) secured to the drive shaft for rotation of the drive shaft;
a fan wheel (21);
a ball bearing (22) interposed between the fan wheel and the drive shaft;
and means (20) for rotating the fan wheel upon rotation of the drive shaft within a limited speed range, but permitting relative rotation of the drive shaft and the fan wheel when the limited speed range is exceeded,
comprising, in accordance with the invention,
a pair of coaxially aligned inner ball bearing race elements (24,25) for said ball bearing, located on the drive shaft, one of the race elements (24) having a hub-like axial extension (34) and the other race element being an axially slidable ring (25) located on said hub-like extension;
an outer race (23) secured to the fan wheel;
balls (22) interposed between said outer race and the pair of race elements,
each race element of said pair having a running surface (30,31) for the balls; and
axial friction force means (26) applying an axial force against said pair of races to frictionally clamp the balls of the ball bearing, during rotation of the shaft within said limited speed range, against the races, but permit relative rotation of the shaft and the fan wheel when the loading reaction force exerted by the fan wheel, upon exceeding the speed range, on the outer race (23) rises above the axially directed friction clamping force.

11. Alternator according to claim 10, wherein said axially directed force means comprises a ring disk (26) having a portion engaging said axially slidable race element (25), and having another portion supported against the drive pulley in fixed axial position.

12. Alternator according to claim 11, wherein said ring disk comprises a shallow cup spring.

13. Alternator according to claim 11, wherein said drive pulley (18) is formed with an axially extending ring-shaped recess;
and said ball bearing is located within said axially extending recess.

14. Alternator according to claim 12, wherein said drive pulley (18) is formed with an axially extending ring-shaped recess;
said ball bearing is located within said axially extending recess;
and the outer region of the shallow cup spring bears against an axially directed surface of said pulley within said recess.

15. Alternator according to claim 14, further including means (11) defining an abutment for axially positioning said one race part (24) having the axially extending hub portion (34) thereon in axially fixed location on the drive shaft of the alternator.

16. Alternator according to claim 12, further comprising
means (28,29) for adjusting friction in said friction force means (20) by varying deformation of said cup spring (26).

17. Alternator according to claim 16, wherein said friction adjusting means comprises:
a threaded end portion (29) on said shaft (12) adjacent said pulley (18); and
a nut (28) adjustably mounted in axial relation to said cup spring (26) on said threaded end portion (29).

* * * * *